(12) United States Patent  
Lancaster et al.

(10) Patent No.: US 9,288,626 B2  
(45) Date of Patent: Mar. 15, 2016

(54) SYSTEM AND METHOD FOR DETERMINING PRECISE GEO-LOCATION OF A FIXED-LOCATION RADIO DEVICE

(71) Applicant: Spectrum Bridge, Inc., Lake Mary, FL (US)

(72) Inventors: James C. Lancaster, Clermont, FL (US); Peter Stanforth, Winter Springs, FL (US); Jeffrey C. Schmidt, Orlando, FL (US); Mario A. Camchong, Oviedo, FL (US)

(73) Assignee: Spectrum Bridge, Inc., Lake Mary, FL (US)

( * ) Notice: Subject to any disclaimer, the term of this patent is extended or adjusted under 35 U.S.C. 154(b) by 171 days.

(21) Appl. No.: 14/091,287

(22) Filed: Nov. 26, 2013

(65) Prior Publication Data

US 2014/0148190 A1   May 29, 2014

Related U.S. Application Data

(60) Provisional application No. 61/731,016, filed on Nov. 29, 2012.

(51) Int. Cl.
*H04W 72/00* (2009.01)
*H04W 4/02* (2009.01)

(52) U.S. Cl.
CPC .................................... *H04W 4/025* (2013.01)

(58) Field of Classification Search
CPC ... G01S 5/0236; G01S 5/0036; G01S 5/0242; G01S 5/02; G01S 5/14; G01S 13/878; G01S 7/412; G06Q 10/10; G06Q 30/06; G06Q 50/188; G06Q 30/0633; G06Q 30/0601; G06Q 30/0631; G06Q 30/0641; G06Q 10/087; H04W 64/00; H04W 24/00; H04W 40/20; H04L 63/20; H04L 25/03343; G06K 7/10683; G06K 7/10693; G06K 7/1096; G06K 9/183; A61M 2205/18; A61M 2205/50; A61M 2205/60; A61M 2205/8206
USPC ................................................ 455/454, 456.6
See application file for complete search history.

(56) References Cited

U.S. PATENT DOCUMENTS

| | | | |
|---|---|---|---|
| 6,741,863 | B1 | 5/2004 | Chiang et al. |
| 2003/0022675 | A1* | 1/2003 | Mergler ......................... 455/456 |
| 2003/0234288 | A1* | 12/2003 | Canipe et al. .................. 235/383 |
| 2004/0198392 | A1* | 10/2004 | Harvey et al. ............... 455/456.1 |
| 2004/0266457 | A1* | 12/2004 | Dupray ....................... 455/456.5 |
| 2007/0077945 | A1* | 4/2007 | Sheynblat ................... 455/456.5 |

OTHER PUBLICATIONS

International Search Report and Written Opinion from corresponding International Application No. PCT/US13/72106, mailed on Apr. 23, 2014.

* cited by examiner

*Primary Examiner* — Nimesh Patel
(74) *Attorney, Agent, or Firm* — Tucker Ellis LLP (57) ABSTRACT

To determine precise geographical location of a fixed-location radio device, the fixed-location radio device may enter a configuration mode and receive location data from a separate electronic device that is within close proximity to the fixed-location radio device. The location of the electronic device is used as a proxy for the location of the fixed-location radio device.

21 Claims, 4 Drawing Sheets

SYSTEM AND METHOD FOR DETERMINING PRECISE GEO-LOCATION OF A FIXED-LOCATION RADIO DEVICE

RELATED APPLICATION DATA

This application claims the benefit of U.S. Provisional Patent Application No. 61/731,016, filed Nov. 29, 2012, the disclosure of which is herein incorporated by reference in its entirety.

TECHNICAL FIELD OF THE INVENTION

The present technology relates generally to fixed-location radio devices, and more particularly, to a system and method for determining and authenticating the geo-location of a fixed-location radio device.

BACKGROUND

Some functions of a fixed-location radio device rely on precise geographic location information. The location information is sometimes obtained during an initial configuration routine. However, it may be undesirable to integrate a GPS receiver or other self-determining location capability into the radio device since the radio device is not expected to move very often during its operational lifespan. For instance, it is expected that the radio device will not move and, if it is moved to a new location, the initial configuration will be carried out again. Configuration is expected to be carried out with extreme infrequency, perhaps as seldom as once during the lifetime of the radio device. Therefore, including self-determining location capability in fixed-location radio devices is considered uneconomical due to its infrequency of use.

In addition, the process of measuring, recording and transferring location data, for example to a remote spectrum management server, may not be accurate, reliable or practical, even with reliance on GPS. Fixed-location radio devices are often deployed in places (e.g., indoors) with poor or inaccurate GPS triangulation. Furthermore, if different radio devices were to report location data in different manners, a remote spectrum management system would need to be configured to act on location information reported using multiple reference point datums (WGS, NAD, etc.) and formats (DMS, decimal degrees, etc.).

There are several reasons why location information for a fixed-location radio device is desirable. One reason is to provide the ability to acquire location specific information, such as spectrum or channel availability information for the location. An example of channel availability information that is location specific is a list of available television (TV) white space channels that is obtained from a TV white space registration management system.

DETAILED DESCRIPTION OF EMBODIMENTS

Embodiments will now be described with reference to the drawings, wherein like reference numerals are used to refer to like elements throughout. It will be understood that the figures are not necessarily to scale. Features that are described and/or illustrated with respect to one embodiment may be used in the same way or in a similar way in one or more other embodiments and/or in combination with or instead of the features of the other embodiments. Further, although method descriptions and flow charts may show specific orders of executing steps, the order of executing the steps may be changed relative to the order described. Also, two or more steps described in succession may be executed concurrently or with partial concurrence. One or more of the described or illustrated steps may be omitted.

The present disclosure describes systems and methods of configuring a fixed-location radio device with precise geographic location information. According to one aspect of the disclosure, a location determining method for a fixed-location radio device involves bringing a second, separate electronic device with location determining capabilities into close proximity of the fixed-location radio device. The fixed-location radio device enters a configuration mode and receives location data representing the geographical location of the second electronic device. The location data serves as a proxy for the actual location of the fixed-location radio device and the fixed-location radio device populates an internal configuration field with the location represented by the location data for future use. The fixed-location radio device exits the configuration mode and begins (or resumes) normal operation. Techniques for verifying that the location data was obtained in close proximity to the fixed-location radio device also are described. Also described are techniques for monitoring for possible movement of the fixed-location radio device following configuration of its location information.

Figure 1:
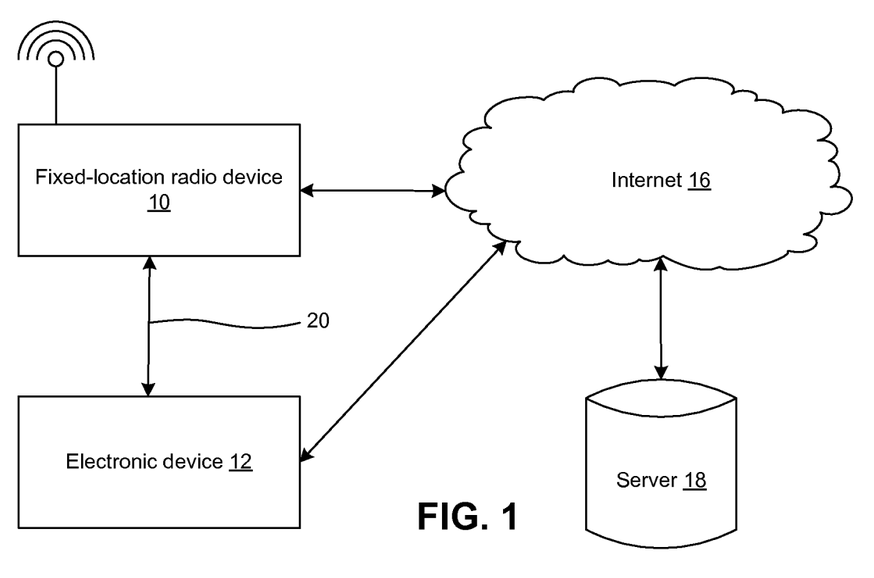
FIG. 1 is a schematic view of an exemplary system for configuring a fixed-location radio device with precise geographic location information.

Referring initially to FIG. 1, shown is an exemplary system that includes a fixed-location radio device 10 and a separate electronic device 12. The fixed-location radio device 10 may be any device with radio-transmitting capability including, but not limited to, a WiFi access point, a fixed location TV white space radio (e.g., a television band radio device or TVBD), a base station, and so forth. While the fixed-location radio device 10 is a radio device that is not intended to be frequently moved, the device need not be permanently affixed to a location or structure. Typically, the electronic device 12 is a portable electronic device and has communication capabilities that are compatible with communication capabilities of the fixed-location radio device 10, as will be described in greater detail.

The electronic device 12 may be any suitable electronic device with location-determining capability, examples of which include a mobile telephone, a tablet, laptop or other computer, etc. The location-determining capability of the electronic device 12 may be implemented with or supported by an advanced location service, for example, GPS, assisted-GPS (A-GPS or aGPS), cellular base station triangulation, and/or location assessment based on wireless LAN detection that works in combination with a database service (e.g., a database of WiFi access point location information such as the database services offered under the designation "Skyhook" by Skyhook Wireless, Inc. of 34 Farnsworth Street, 5th Floor, Boston, Mass. 02210), or any other location determination technique.

In the exemplary system of FIG. 1, the fixed-location radio device 10 and the electronic device 12 are within close physical proximity of each other. In one embodiment, the term close proximity means 50 meters or less, which is consistent with the current location granularity specified by the Federal Communication Commission (FCC) in the U.S. for valid whitespace channel lists.

In some embodiments, at least some communications between the fixed-location radio device 10 and the electronic device 12 are direct. Direct communication may be wired or wireless using any suitable protocol for data transfer. In other embodiments, at least some communications between the fixed-location radio device 10 and the electronic device 12 are indirect. Indirect communications include communications through a separate network apparatus and may include communications through the Internet 16 and/or by way of a remote server 18. The remote server 18 need not be a single device in a single place. Any functions described herein that are performed by the server 18 may be performed by any combination of one or more servers in one or more different locations.

Figure 2:
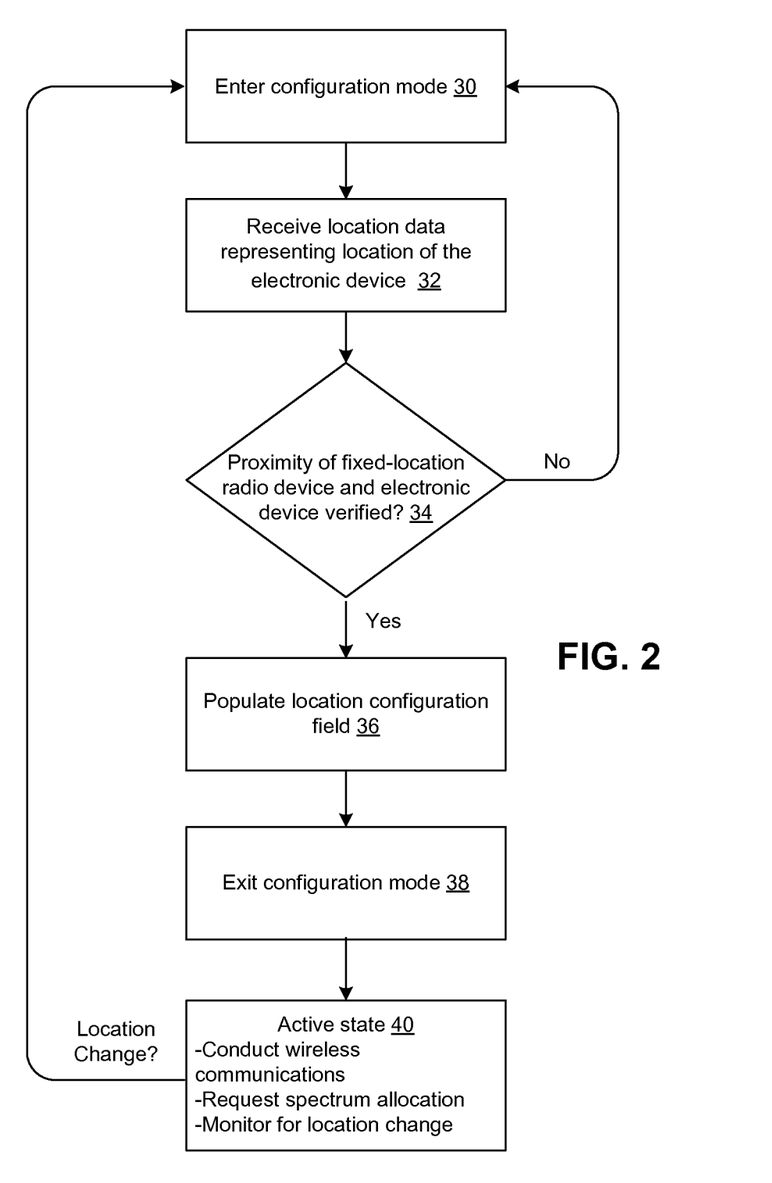
FIG. 2 is a flow diagram representing exemplary actions taken by a fixed-location radio device.

With additional reference to FIG. 2, illustrated is a flow chart diagram that depicts an exemplary method for configuring the fixed-location radio device 10 with precise geographic location information. FIG. 2 depicts steps carried out by the fixed-location radio device 10. Complimentary steps carried out by the electronic device 12 and the server 18 will be apparent from the following description.

The method may begin at step 30, in which the fixed-location radio device 10 enters a configuration mode. The configuration mode may be a default mode for the fixed-location radio device 10 that is entered into when the device is powered on for the first time. The configuration mode may be triggered at other times, such as if the fixed-location radio device 10 changes location, if a user manually triggers the configuration mode, or after a predetermined amount of time elapses since a previous configuration. The fixed-location radio device 10 may also return to step 30 should there be a failure to verify or authenticate location data. The configuration mode may place the fixed-location radio device 10 in a state where it is unable to perform some communication functions, such as operating as an access point or a radio device.

The configuration mode includes storing a location value for the fixed-location radio device 10 in memory of the fixed-location radio device 10 or in memory of the server 18. Other configuration operations may be performed during the configuration mode.

As part of the configuration process, a user overseeing the configuration process may obtain location data with the electronic device 12. The location data represents the location of the electronic device 12 at the time that the electronic device 12 made a location determination. In one embodiment, the location data is time-stamped with a time at which the location determination was made. The location data will be used to further represent the location of the fixed-location radio device 10. Therefore, it is desirable that the electronic device 12 makes the location determination in close proximity to the fixed-location radio device 10. In some instances, precision of the location determination may be improved if the electronic device 12 makes the location determination some distance from the fixed-location radio device 10 rather than if positioned very close to the fixed-location radio device 10 (e.g., within 5 meters) during location determination. For instance, if the fixed-location radio device 10 is indoors, it may be desirable for the user to carry the electronic device 12 outdoors, make a location determination, and then use the determined location as the location of the fixed-location radio device 10. But this means that accuracy of the fixed-location radio device 10 could be compromised due to unintended or malicious misuse of the location determination capability of the electronic device 12 to generate the location of the fixed-location radio device 10. The techniques described below reduce the chance that the location, as determined by the electronic device 12, is inaccurate for the fixed-location radio device 10 to the extent that a whitespace channel map that is generated for the fixed-location radio device 10 using the location as determined by the electronic device 12 would be invalid for the actual location of the fixed-location radio device 10.

At step 32, the fixed-location radio device 10 receives location data representing the location of the electronic device 12 having location determining capabilities. As indicated, the location data serves as a proxy for the actual location of the fixed-location radio device 10. The location data may be location coordinates associated with a precision metric, such as precision quantified by a calculated DOP (diameter of precision) of the location measurement.

In one embodiment, at step 34, the fixed-location radio device 10 (or the server 18) verifies that the location data accurately represents the actual location of the fixed-location radio device 10 to the extent that a whitespace channel map that is generated for the fixed-location radio device 10 using the location as determined by the electronic device 12 would be valid for the actual location of the fixed-location radio device 10. The location of the fixed-location radio device 10 may be used for operations of the fixed-location radio device 10, such as requesting and obtaining a spectrum allocation or channel map of available channels that may be used by the fixed-location radio device 10 for wireless communications. In an exemplary embodiment, the fixed-location radio device 10 may be a TVBD that registers with the server 18 for a TV whitespace channel map that is based on the location of the fixed-location radio device 10. If the reported location of the fixed-location radio device 10 does not accurately represent the actual location of the fixed-location radio device 10, then spectrum allocations or channel maps provided by the server 18 may contain channels (or an identification of spectrum) that are protected for the exclusive use of other radio systems, often referred to as incumbent systems. Therefore, some exemplary techniques for verifying the relative accuracy and/or authenticity of the location data involves verifying that the electronic device 12 is within close proximity to the fixed-location radio device 10 at the time that the location measurement is made.

Various verification techniques will be discussed. One or more verification techniques may be employed. Therefore, aspects of some of the verification techniques need not be employed in every instance. For example, one technique involves use of a wired or wireless short-range communication link 20. But location data or other data may be transferred through a network to the fixed-location radio device 10 and/or the server instead of through the wired or wireless short-range communication link 20 when one or more of the other verification techniques are employed. If the verification succeeds, the fixed-location radio device 10 may proceed to another configuration mode step (e.g., step 36). If the verification of step 34 should fail, the fixed-location radio device 10 may return to step 30 to await new location data.

One approach to verifying accuracy is to verify that the receiving of the location data by the fixed-location radio device 10 is carried out when the electronic device 12 is within close proximity to the fixed-location radio device 10. One exemplary technique for communicating the location data when the devices 10, 12 are in close proximity is to use a wired or wireless short-range communication link 20. The fixed-location radio device 10 may verify the use of the short-range communication link 20 before proceeding to another step. A wired short-range communication link 20 may include a temporary, physical tether between the devices 10, 12 with a communications cable, typically without any intervening active devices between the devices 10, 12. Exemplary cable types and coordinating communications interfaces/standards for this purpose include, but are not limited to USB, Ethernet, Firewire, etc. A wireless short-range communication link 20 is an operative radio-based communication link directly between the devices 10, 12 that uses radio equipment with limited transmission range and/or has a distance that may be confirmed, such as with signal strength detection. Exemplary wireless communications standards or protocols for this purpose include Bluetooth, WiFi with RSSI measurement, RFID, NFC, and optical (e.g., infrared) links.

As an alternative verification technique, or a verification technique that is used in combination with one or more of the other verification techniques described herein, the fixed-location radio device 10 (or the server 18) verifies that the electronic device 12 made the location determination within a predetermined amount of time before transmitting the location data to the fixed-location radio device 10 (or the server 18). The predetermined amount of time may be, for example, five minutes, two minutes, one minute, or some other amount of time. The predetermined amount of time may be selected to be relatively short, but still leave the user adequate time to move from the position at which the location determination was made to the position at which the transmission is made. The predetermined amount of time may be verified by checking the time stamp of the location data against a time at which the fixed-location radio device 10 (or the server 18) receives the location data.

To trigger the electronic device 12 to make a location determination to generate the location data that is received by the fixed-location radio device 10 in step 32, the user may prompt the electronic device 12 to make the location determination. As indicated, this may be performed at a distance from the fixed-location radio device 10. The electronic device 12 may alternatively transmit location data stored in a memory from a prior location determination.

Other triggers to make the location determination may be used as an alternative verification technique, or a verification technique that is used in combination with one or more of the other verification techniques described herein. An exemplary trigger is a location request message set from the fixed-location radio device 10 (or the server 18) to the electronic device 12 that places the electronic device 12 in a location determining mode. The trigger message may be transmitted over a wired or wireless short-range communication link 20 as described above to ensure that the electronic device 12 is in close physical proximity with the fixed-location radio device 10 when the trigger message is received by the electronic device 12. Once received the trigger message is received, the user may have a predetermined amount of time to complete certain tasks. These tasks may include one or more of disconnecting the wired or wireless short-range communication link 20, bringing the electronic device 12 to an appropriate spot for location determination, inputting a command to the electronic device 12 that prompts the electronic device 12 to make the location determination, returning to the area of the fixed-location radio device 10 and reestablishing the wired or wireless short-range communication link 20, and transmitting the location data. The predetermined amount of time may be five minutes, two minutes, one minute, or some other amount of time. In one embodiment, only location data that is generated while the electronic device 12 is in the triggered location determining mode will be accepted by the fixed-location radio device 10 (or the server 18). The time stamp of the location data may be used for this purpose and/or the triggered location determining mode may be locked to user actions other than those used to support the configuration mode of the fixed-location radio device 10.

An alternative verification technique, or a verification technique that is used in combination with one or more of the other verification techniques described herein, is to independently assess the location data. In one embodiment, the location data is reported to the server 18. Also reported to the server 18 is spectrum sensing information that is generated by the fixed-location radio device 10. The spectrum sensing information includes field strength measurements for each of a predetermined number of channels.

The channels are selected so that at least some of the channels should contain detectable radio emissions from transmitters with known locations and broadcast characteristics. Exemplary channels for this purpose are UHF and/or VHF TV bands on which TV station transmitters operate. Using the known locations and broadcast characteristics of transmitters having coverage areas that contain the location represented by the location data, the server 18 generates a predicted spectrum profile (or "spectrum fingerprint") of signal strengths that the fixed-location radio device 10 ought to detect at the location represented by the location data. The predicted spectrum profile for the location may be determined by applying a path loss model to the broadcast characteristic information for each of the known transmitters. If the sensed signal strength data correlates with the predicted spectrum profile, then it may be concluded that the fixed-location radio device 10 is in the location represented by the location data. But if the sensed signal strength data does not correlate with the predicted spectrum profile, it may be concluded that the fixed-location radio device 10 is not in the location represented by the location data. Additional description of verifying a location using sensed radio signals is set forth in U.S. patent application Ser. No. 14/091,267, filed Nov. 26, 2013, the disclosure of which is herein incorporated by reference in its entirety.

An alternative verification technique, or a verification technique that is used in combination with one or more of the other verification techniques described herein, is to use unique information corresponding to the fixed-location radio device 10. This technique may be employed in cases where the electronic device 12 and the fixed-location radio device 10 do not communicate directly with one another, but communicate via the Internet 16 or each separately communicate with the server 18.

The unique information corresponding to the fixed-location radio device 10 may be a unique key that is configured and used by the relevant devices to ensure that the electronic device 12 and the fixed-location radio device 10 are in close proximity when the location data is generated by the electronic device 12. The key may be electronic data (e.g., an alphanumeric code) and, in one embodiment, uniquely identifies the fixed-location radio device 10 or may be used to distinguish the fixed-location radio device 10 from other devices. Exemplary keys include, but are not limited to, a product identifier (product ID) for the fixed-location radio device, which may be an FCCID in at least the U.S.), a key generated with a random number generator or a routine used to generate computer security keys, or some other value. The key may be stored in memory in the fixed-location radio device 10 or in the server 18, the key may be generated on as as-needed basis by the fixed-location radio device 10 or by the server 18, or may result from actions taken by one or more of the devices, such as by scanning a bar code with the electronic device 12.

In the described embodiments, the electronic device 12 obtains the key by an appropriate method, such as by scanning a bar code or by communications with the fixed-location radio device 10 or the server 18. The process of the electronic device 12 obtaining the key and then the electronic device 12 communicating the key to the fixed-location radio device 10 or the server 18 is used to verify the close proximity between the electronic device 10 and the fixed-location radio device 12. To this end, several types of keys, several ways for the electronic device 12 to obtain the key, and several ways for the electronic device 12 to communicate the key are described.

In one embodiment, the key is obtained by the electronic device 12 in a manner that maximizes the likelihood that the electronic device 12 is in close proximity with the fixed-location radio device 10. For instance, the key may be communicated from the fixed-location radio device 10 to the electronic device 12 over the wired or wireless short-range communication link 20, which is a communication medium known to have a limited range. In addition, or alternatively, the electronic device 12 may communicate the key (with or without the location data) back to the fixed-location radio device 10 for verification over the wired or wireless short-range communication link 20. One or both of these communications techniques may be employed in cases where the key is generated, stored and/or validated (upon return of the key from the electronic device 12) by the fixed-location radio device 10 or in cases where the key is generated, stored and/or validated (upon return of the key from the electronic device 12) by the server 18. In the case where the key is generated, stored and/or validated by the server 18 and one or more communications to or from the electronic device 12 and involving the key are via the fixed-location radio device 10 and the wired or wireless short-range communication link 20, additional communications will occur between the fixed-location radio device 10 and the server 18 via another communications medium (e.g., the Internet 16). In the case where the key is generated, stored and/or validated by the server 18 and one or more communications to or from the electronic device 12 and involving the key are not via the fixed-location radio device 10 and the wired or wireless short-range communication link 20, additional communications will occur between the electronic device 12 and the server 18 via another communications medium (e.g., the Internet 16).

In another embodiment, the key is obtained by the electronic device 12 by optically scanning key data from which the key is derived. Optically scanning, as used herein, refers to bar code reading techniques, which include photographing and electronically processing key data. The key data preferably is affixed on the fixed-location radio device 10 by printing, attaching a label, etc. Alternatively, the key data is affixed to packaging for the fixed-location radio device 10 or documentation for the fixed-location radio device 10. Exemplary key data that may be scanned is a bar code that is affixed to one of these items. The bar code may be a series of lines (e.g., similar to a universal product code (UPC) bar code format) or a two dimensional, matrix type bar code (e.g., similar to a quick response (QR) bar code format).

In another embodiment, the key is displayed on a display of fixed-location radio device 10 and optically read by the electronic device 12 or manually keyed into the electronic device 12 by the user. In another embodiment, such as when the key is transmitted from the server 18 to the electronic device 12, the key is displayed on a display of electronic device 12 and optically read by the fixed-location radio device 10 or manually keyed into the fixed-location radio device 10 by the user.

The key may be a permanent key for the fixed-location radio device 10 and does not change over time. Alternatively, the key is uniquely generated for the iteration of the configuration mode and has is valid for a limited period of time (e.g., five minutes, two minutes, one minute or some other period of time). In the case of a key with an expiration, the user may have the duration during which the key is valid to complete certain tasks. These tasks may include one or more of receiving the key, disconnecting the wired or wireless short-range communication link 20, bringing the electronic device 12 to an appropriate spot for location determination, inputting a command to the electronic device 12 that prompts the electronic device 12 to make the location determination, returning to the area of the fixed-location radio device 10 and reestablish the wired or wireless short-range communication link 20, and transmitting the key and location data.

In other cases, the key may be communicated to the electronic device 12 concurrently with or after the electronic device 12 transmits the location data. In this case, to complete validation, the electronic device 12 may transmit the key to an appropriate destination (e.g., the fixed-location radio device 10 or the server 18) over an appropriate communications medium (e.g., the wired or wireless short-range communication link 20 or the Internet 16). This task may need to be completed within a predetermined amount of time following the communication of the location data from the electronic device 12 to the fixed-location radio device 10 or the server 18.

Upon return of the key and location data to the fixed-location radio device 10 (or the server 18), the fixed-location radio device 10 (or the server 18) verifies the value of the key and, if appropriate, validates that other key-related actions were carried out appropriately (e.g., one or more communications were made over an appropriate medium or a certain action was performed manually at the fixed location radio device 10) and/or that the key has not expired. If the key is determined by the fixed-location radio device 10 (or the server 18) to be valid, then the location data is accepted. For validation purposes, the key may be communicated between the fixed-location radio device 10 and the server 18 in addition to being communicated between one of the fixed-location radio device 10 or the server 18 and the electronic device 12.

Figure 3:
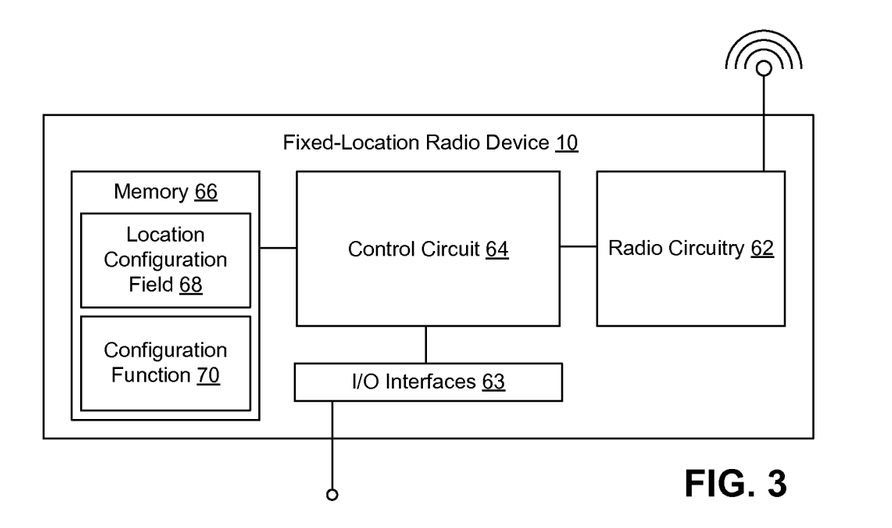
FIG. 3 is a schematic view of an exemplary fixed-location radio device.

Following successful validation of the location data, the logical flow may proceed to step 36. In step 36, a location configuration field of the fixed-location radio device 10 is populated with a location value corresponding to the location represented by the location data generated from the electronic device 12. In one embodiment, the fixed-location radio device 10 stores the location value in a non-transitory computer readable medium, such as a memory 66 (FIG. 3). The location value may be in the same data format as the location data or the location value may be in a different data format. Regardless of the data format of the location value, the location value and the location data represent the same location. In another embodiment, the location value is adjusted relative to the location data. For instance, the location value may be adjusted for distance and possibly compass direction between the fixed-location radio device 10 and the electronic device 12 at the time that the location is determined by the electronic device 12. The distance between the fixed-location radio device 10 and the electronic device 12 may be measured with a tape measure, a laser, or another device. Another way to determine the distance is to start or end with the devices 10, 12 touching or within several meters of each other, and track movement of the electronic device 12 between this position and a position at which the location is determined Motion tracking may be made with an accelerometer, for example.

At step 38, the fixed-location radio device 10 exits the configuration mode. Once configuration of the fixed-location radio device 10 is complete, the fixed-location radio device 10 may enter an active state at step 40 where the fixed-location radio device 10 conducts wireless communications. Entering the active state may require successful completion of obtaining a validated location in accordance with the above-described steps or other techniques.

While in an active state, the fixed-location radio device 10 may conduct intended wireless communication functions. In one embodiment, the wireless communications include transmitting a request to the server 18 for a spectrum allocation and/or a channel map containing an identification of spectrum or channels that may be used by the fixed-location radio device 10 for wireless communications. The request may contain the location value, if not already known to the server 18. The spectrum or channels in the spectrum allocation or channel map provided by the server 18 to the fixed-location radio device 10 may be generated for the location value. Following the exemplary embodiment of a whitespace channel allocation, the server 18 may evaluate the coverage areas of protected radio devices. If a coverage area includes the location represented by the location value, then the primary operating channel of the protected radio device will not be available for use by the fixed-location radio device 10. Channels that are not used by an incumbent radio device at the location represented by the location value may be considered available for use by the fixed-location radio device 10 and those channels may be communicated to the fixed-location radio device 10 in a channel list.

In the active state, the fixed-location radio device 10 and/or the server 18 may monitor the fixed-location radio device 10 to determine if the fixed-location radio device 10 has moved in a manner indicating potential for the fixed-location radio device 10 to have changed geographical location. A change in geographical location may be movement that causes the location value to be inaccurate for the fixed-location radio device 10 to the extent that a whitespace channel map that is generated for the fixed-location radio device 10 using the location value would be invalid for the actual location of the fixed-location radio device 10. If it is determined that the fixed-location radio device 10 has potentially changed geographical location, an authorization to continue wireless communications may be revoked until the location of the fixed-location radio device is revalidated or re-established. In one embodiment the fixed-location radio device 10 may reenter the configuration mode at step 30 to repeat the above-described steps.

There are a number of methods for determining if the fixed-location radio device 10 has potentially changed location. One exemplary technique involves monitoring the output of a motion sensor (e.g., an accelerometer) that is embedded within the fixed-location radio device 10.

Another exemplary technique of monitoring potential location changes of the fixed-location radio device 10 involves monitoring the IP address and routing information for data packets that are exchanged between the fixed-location radio device 10 and the server 18. If the fixed-location radio device 10 does not change in location, this information should remain relatively consistent over time. Exemplary communications between the fixed-location radio device 10 and the spectrum profile from which this information may be monitored includes, but is not limited to, available channel requests from the fixed-location radio device 10, channel allocations sent to the fixed-location radio device 10, spectrum use reports, radio device monitoring, etc.

Another exemplary technique of monitoring potential location changes of the fixed-location radio device 10 involves periodically collecting spectrum scanning results from the fixed-location radio device 10. The technique also includes comparing the spectrum scanning results against a predicted spectrum profile (or "spectrum fingerprint") of the signal strengths that the fixed-location radio device 10 ought to detect at the location represented by the location value. The predicted spectrum profile may be generated in the manner described above. If there is a high correlation between these data sets, then the fixed-location radio device 10 may be considered to be in the location represented by the location value. But if there is a low correlation between these data sets, then a determination may be made that the fixed-location radio device 10 moved from the location represented by the location value. Additional description of verifying a location using sensed radio signals is set forth in U.S. patent application Ser. No. 14/091,267, filed Nov. 26, 2013, the disclosure of which is herein incorporated by reference in its entirety.

With additional reference to FIG. 3, illustrated is a schematic block diagram of an exemplary hardware configuration of the exemplary fixed-location radio device 10. The fixed-location radio device 10 includes radio circuitry 62 for conducting wireless communications. Since the fixed-location radio device 10 may carry out wireless communications over multiple protocols and at different frequencies, the illustrated radio circuitry 62 may represent more than radio transceiver. The fixed-location radio device 10 also may have one or more physical input/output (I/O) interfaces 63 that are used to establish wired communication connections (e.g., a wired short-range communication link with the electronic device 12). In one embodiment, the fixed-location radio device 10 may include an optical interface (e.g., an infrared receiver and/or transmitter). Other components may be present, such as a motion sensor assembly (e.g., one or more accelerometers), a display, a user interface (e.g., a touch input associated with a display and/or a key pad), etc.

Overall functionality of the fixed-location radio device 60 may be controlled by a control circuit 64. The control circuit 64 may execute code stored in a memory (not shown) within the control circuit 64 and/or in a separate memory (e.g., memory 66) in order to carry out the above-described method for configuring a fixed-location radio device 10. In one embodiment, the functionality is embodied as executable code (e.g., a configuration function 70) that is stored by the memory 66 and executed by the control circuit 64. The memory 66 is a non-transitory computer readable medium and may be embodied as one or more of an electronic memory (e.g., a buffer or a flash memory), a magnetic memory (e.g., a hard drive), or an optical memory (an optical disk). In a typical arrangement, the memory 66 may include a non-volatile memory for long-term data storage and a volatile memory that functions as system memory (e.g., RAM) for the control circuit 64. The memory 66 may exchange data with the control circuit 64 over a data bus. Accompanying control lines and an address bus between the memory 66 and the control circuit 64 also may be present. Further, the memory 66 includes the location configuration field 68 for storing the location value representing the location of the fixed-location radio device 10.

Figure 4:
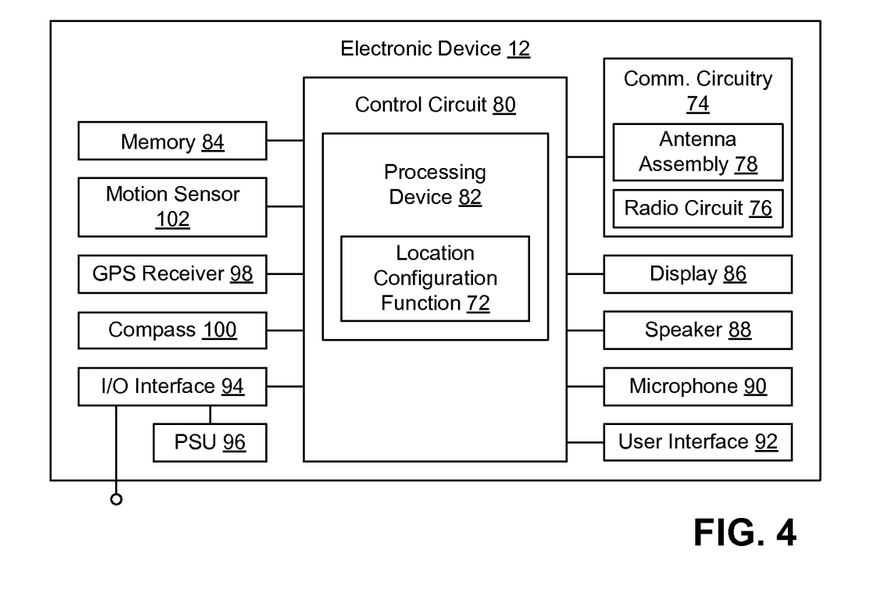
FIG. 4 is a schematic view of an exemplary electronic device used to facilitate the configuring of the fixed-location radio device.

With additional reference to FIG. 4, shown is schematic illustration of the electronic device 12 when configured as a mobile telephone (e.g., a smartphone). The electronic device 12 may include a location configuration function 72 that embodies the functions described above for providing location data to the fixed-location radio device 10.

The electronic device 12 includes communications circuitry 74. In the illustrated exemplary embodiment, as part of the communications circuitry 74, the electronic device 12 includes a radio circuit 76 and an antenna assembly 78. The communications circuitry 74 may be used to carry out various wireless communications functions, including communicating with the server 18 and/or the fixed-location radio device 10. In the exemplary case where the electronic device 12 is a mobile telephone, communications functions also may include engaging in voice or video calls, and sending or receiving messages (e.g., email messages, text messages, multimedia messages, instant messages, etc.), accessing the Internet, etc.

The illustrated components of the communications circuitry 74 may represent one or more than one radio transceiver to enable the electronic device 12 to be able to communicate over various types of network connections and/or protocols. For instance, the electronic device 12 may be configured to communication with a cellular communications network. Additionally, or as an alternative to cellular communications capability, the electronic device 12 also may be configured to communicate with other types of networks, such as a packet-switched network (e.g., WiFi or WiMAX).

Overall functionality of the electronic device 12 may be controlled by a control circuit 80 that includes a processing device 82. The processing device 82 may execute code stored in a memory within the control circuit 80 and/or in a separate (e.g., memory 84) in order to carry out the operations of the electronic device 12. For instance, the processing device 82 may be used to execute the location configuration function 72. The memory 84 is a non-transitory computer readable medium and may be, for example, one or more of a buffer, a flash memory, a hard drive, a removable media, a volatile memory, a non-volatile memory, a random access memory (RAM), or other suitable device. In a typical arrangement, the memory 84 includes a non-volatile memory for long term data storage and a volatile memory that functions as system memory for the control circuit 80. The memory 84 may exchange data with the control circuit 80 over a data bus. Accompanying control lines and an address bus between the memory 84 and the control circuit 80 also may be present.

The electronic device 12 may include a display 86 for displaying visual information to a user. Also, the electronic device 12 may include a speaker 88 and a microphone 90 to allow the user to carry out voice conversations. One or more user interfaces 92, such as a keypad and/or a touch-sensitive input associated with the display 86, may be present to provide for a variety of user input operations.

The electronic device 12 may further include one or more input/output (I/O) interface(s) 94. The I/O interface(s) 94 may include one or more electrical connectors for connecting the electronic device 12 to another device (e.g., a computer or the fixed-location radio device 10) or an accessory (e.g., a personal handsfree (PHF) device) via a cable, and/or for connecting the electronic device 12 to a power supply. Therefore, operating power may be received over the I/O interface(s) 94 and power to charge a battery of a power supply unit (PSU) 96 of the electronic device 12 may be received over the I/O interface(s) 94. The PSU 96 may supply power to operate the electronic device 12 in the absence of an external power source.

A position data receiver, such as a global positioning system (GPS) receiver 98, may be involved in determining the location of the electronic device 12. A compass 100 may be used to determine the orientation of the electronic device 12. One or more motion sensors 102, such as accelerometers, may be used to sense movement of the electronic device 12.

Figure 5:
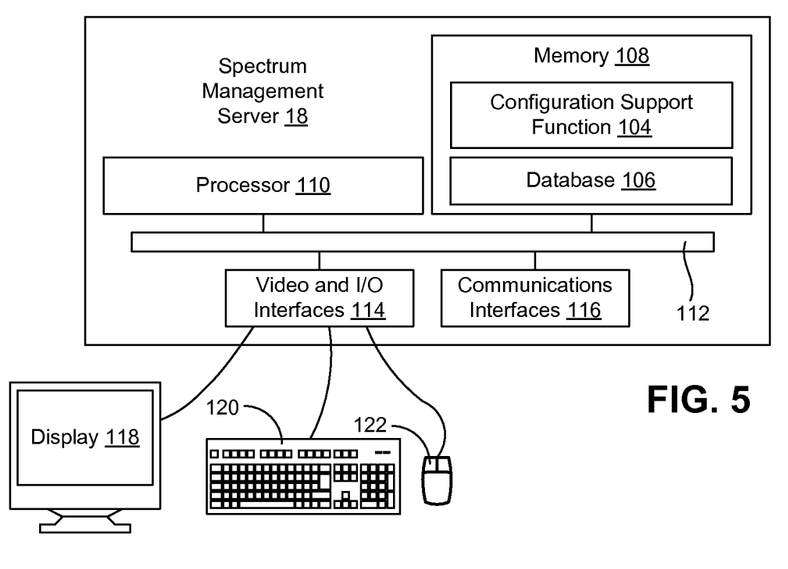
FIG. 5 is a schematic view of an exemplary server used to support functions of the fixed-location radio device.

With additional reference to FIG. 5, the server 18 may be implemented as a computer-based system that is capable of executing computer applications (e.g., software programs), including a configuration support function 104. The configuration function 70 of the fixed-location radio device 10, the location configuration function 72 of the electronic device 12, and the configuration support function 104 of the server 18 may cooperate with each other to determine and verify the location of the fixed-location radio device 10. The location verification function 18 and a database 106 may be stored on a non-transitory computer readable medium, such as a memory 108. The database 106 may be used to store various information sets used to carry out the functions described in this disclosure. The memory 108 may be a magnetic, optical or electronic storage device (e.g., hard disk, optical disk, flash memory, etc.), and may comprise several devices, including volatile and non-volatile memory components. Accordingly, the memory 108 may include, for example, random access memory (RAM) for acting as system memory, read-only memory (ROM), hard disks, optical disks (e.g., CDs and DVDs), tapes, flash devices and/or other memory components, plus associated drives, players and/or readers for the memory devices.

To execute logical operations, the server 18 may include one or more processors 110 used to execute instructions that carry out logic routines. The processor 110 and the memory 108 may be coupled using a local interface 112. The local interface 112 may be, for example, a data bus with accompanying control bus, a network, or other subsystem.

The server 18 may have various input/output (I/O) interfaces 114 as well as one or more communications interfaces 116. The interfaces 114 may be used to operatively couple the server 18 to various peripherals, such as a display 118, a keyboard 120, a mouse 122, etc. The communications interface 116 may include, for example, a modem and/or a network interface card. The communications interface 116 may enable the server 18 to send and receive data signals, voice signals, video signals, and the like to and from other computing devices or radio devices (e.g., the fixed-location radio device 10 and the electronic device 12) via an external network (e.g., the Internet 16). In particular, the communications interface 116 may connect the server 18 to the Internet 16.

In one embodiment, the server 18 may be configured to host the described spectrum management and location-determining services for a plurality of electronic devices, including the fixed-location radio device 10 and, if appropriate, the electronic device 12. In some embodiments, the services may include verification of the reported location of the fixed-location radio device 10. The services may also include spectrum management functions, such as providing channel lists to qualified radio devices upon registration so as to allow the radio devices to make use of spectrum for wireless communications. Also, while the providing of services may be fully automated, the server 18 may host an Internet-style website for various corresponding parties to conduct initial enrollment with the server 18, conduct manual registration if needed, access various tools and reports supplied by the server 18, and so forth. For supplying the services, the server 18 may collect spectrum usage information from various sources, including but not limited to public databases, private databases and deployed radio devices (e.g., in the form of channel use selections or spectrum sensing results). The database information may contain information about known spectrum users, such as incumbent spectrum users (e.g., digital television stations, wireless microphone systems, cable head end systems, FM radio stations, etc.), licensed spectrum users, or radio systems that are exempt from seeking channel map information in order to operate.

EXAMPLE

In this example, an application (e.g., the location configuration function 72) is written for and installed on the electronic device 12. The application may be obtained from a website that is hosted by the server 12 or a commercial website from which applications for mobile devices are available. The application oversees the determining of a location, the scanning of a bar code on the fixed-location radio device 10 and the submitting of the resulting location data and key (derived from the bar code) to the server 18. Once the data is received by the server 18, the server 18 verifies the information. Database information stored by the server 18 for the fixed-location radio device 10 may be flagged by the server 18 for an update the next time the fixed-location radio device 12 makes communication with the server 18. The communication might be a request for spectrum access (e.g., a whitespace request), for example. At that time, the server 18 may supply the location associated with the received location data to the fixed-location radio device 10 so that the fixed-location radio device 10 may store the location and use the location in future spectrum access requests.

To configure the fixed-location radio device 10 with a location value, the user may launch the application on the electronic device 12. If not already enabled, the application may prompt the user to enable location services (e.g., turn on GPS capabilities) in a manner appropriate for the operating system of the electronic device 12. Next, the application will use the location services capability of the electronic device 12 to acquire the location of the electronic device 12. The application may display a map and indicate the position of the determined location (e.g., with a displayed pin). An estimation of the accuracy of the location measurement also may be displayed. In one embodiment, the map may be interactive and include features such as zoom in, zoom out, and panning.

If the accuracy is not equal to or less than 50 meters, the user may be prompted to reacquire the location until the location accuracy improves to equal or be less than 50 meters. The user may attempt to improve the accuracy by moving the electronic device 12, such as outdoors or away from obstructions. Once a location with an accuracy of 50 meters or less is acquired, the application may store coordinates for the determined location (the stored coordinates being the location data), the accuracy of the location data, and the time at which the location measurement was made. In one embodiment, the user may be permitted to move the pin to manually improve the accuracy of the location of the fixed-location radio device 10. The application may impose a limit on the amount that the pin may be moved, such as a limit of 50 meters. If the pin is manually moved, the location accuracy may be set to a predetermined value, such as a value of zero meters or a value of 50 meters.

Once location data with acceptable accuracy is obtained, the application may prompt the use to scan a bar code on the fixed-location radio device 10. For this purpose, a "scan" button may be displayed. When the scan button is selected, the electronic device 12 scans the bar code. The application may track the amount of time between making the location measurement with acceptable accuracy and scanning the bar code. If more than a predetermined time elapses between these two events, then the application may return to the beginning of the process. The predetermined amount of time may be, for example, five minutes or some other amount of time. In one embodiment, the data obtained from scanning the bar code contains information to identify the fixed-location radio device, such as FCCID and serial number of the fixed-location radio device 10.

In one embodiment, the application causes the electronic device 12 to display identifying information for the fixed-location radio device (e.g., the FCCID and serial number), the coordinates of the determined location, the location accuracy, and a button to submit these items of information to the server 18. In one embodiment, the user may enter other information used in a registration process for the fixed-location radio device 10. This information could include, for example, information about the fixed-location radio device 10 (e.g., antenna height, settings, etc.), information about the owner or operator of the fixed-location radio device 10 (e.g., contact information), or information about the user of the electronic device 12 during the configuration process.

The user may cause the electronic device 12 to transmit the information collected in the foregoing steps to the server 18 by activating the submit button. In one embodiment, the application may track the amount of time between making the location measurement with acceptable accuracy and activating the submit button. If more than a predetermined time elapses between these two events, then the application may return to the beginning of the process rather than submit the information to the server 18. The predetermined amount of time may be, for example, five minutes or some other amount of time.

Upon successful submission of the information to the server 18, the server may evaluate the submitted information and, if the information passes a validation check, the server may communicate the location represented by the submitted location data to the fixed-location radio device 10. The fixed-location radio device 10 may then use the location supplied by the server 18 as the location of the fixed-location radio device 10 during future operations, such as during a request for spectrum access.

Although certain embodiments have been shown and described, it is understood that equivalents and modifications falling within the scope of the appended claims will occur to others who are skilled in the art upon the reading and understanding of this specification.

What is claimed is:

1. A method of configuring a fixed-location radio device with location information, the method comprising:
   during a configuration mode, receiving location data representing a location of an electronic device separate from the fixed-location radio device, the electronic device having location determining capability and located in close proximity to the fixed-location radio device when the location data is determined by the electronic device, and the location of the electronic device functioning as a proxy for the location of the fixed-location radio device;
   during the configuration mode, populating a location configuration field stored by the fixed-location radio device with a location value matching the location represented by the location data, the populated location value representing the geographic location of the fixed-location radio device, wherein the location data is determined by the electronic device and received by the fixed-location radio device within a predetermined amount of time as part of a validity check to ensure that the location of the electronic device is determined in close proximity to the actual geo-location of the fixed-location radio device; and during an active state, requesting spectrum access from a spectrum management server to spectrum that is available for use by the fixed-location radio device to carry out wireless communications at the geographic location represented by the location value.

2. The method of claim 1, wherein the received location data is received from the electronic device over a direct communication link between the fixed-location radio device and the electronic device.

3. The method of claim 1, wherein the received location data is received from a remote server, the server having received the location data from the electronic device.

4. The method of claim 1, the method further comprising verifying that the fixed-location radio device and the electronic device are within the close proximity to each other when the location data is determined by the electronic device, the close proximity being 50 meters or less.

5. The method of claim 4, the verifying comprising determining that the location data is received over one of a short-range wireless communication connection between the electronic device and the fixed-location radio device or a wired communication connection between the electronic device and the fixed-location radio device.

6. The method of claim 5, wherein the location data further includes data representing the time the location data was determined, the method further comprising verifying that the location data was generated within a predetermined time before the location data is one of received by the fixed-location radio device or received by a remote server from the electronic device.

7. The method of claim 4, the verifying comprising:
receiving a key from the electronic device; and
verifying at least two of:
the key has a valid value;
the key is not expired;
less than a predetermined amount of time has elapsed since the key was transferred to or obtained by the electronic device; and
the key was one of transferred to the electronic device, obtained by the electronic device, or received from the electronic device when the electronic device is in close proximity with the fixed-location radio device.

8. The method of claim 4, the verifying comprising measuring signal strength on predetermined channels and transmitting measured signal strength values to a server for comparison to a predetermined spectrum footprint for the location.

9. The method of claim 1, wherein the location data further includes data representing the time the location data was determined, the method further comprising verifying that the location data was generated within a predetermined time before the location data is one of received by the fixed-location radio device or received by a remote server from the electronic device.

10. The method of claim 1, further comprising monitoring to determine if the fixed-location radio device has moved in a manner that indicates potential for the fixed-location radio device to have changed actual geographic location and, if so, repeating the receiving and populating steps.

11. The method of claim 10, the monitoring comprising monitoring output of a motion sensor of the fixed-location radio device.

12. The method of claim 10, the monitoring comprising:
measuring signal strength on predetermined channels;
transmitting measured signal strength values to a server for comparison to a predetermined spectrum footprint for the location; and
receiving data from the server, the data indicating potential for the electronic device to have changed actual geographic location.

13. The method of claim 10, the monitoring comprising monitoring an IP address and routing information for data packets exchanged between the fixed-location device and a remote server.

14. A fixed-location radio device, comprising:
a radio transceiver for establishing wireless communications;
a memory; and
a control circuit that controls operation of the fixed-location radio device and causes the fixed-location radio device to:
during a configuration mode, receive location data representing a location of an electronic device separate from the fixed-location radio device, the location of the electronic device functioning as a proxy for the location of the fixed-location radio device, wherein the location data is determined by the electronic device and received by the fixed-location radio device within a predetermined amount of time as part of a validity check to ensure that the location of the electronic device is determined in close proximity to the actual geo-location of the fixed-location radio device;
during the configuration mode, populate a location configuration field stored in the memory with a location value matching the location represented by the location data, the populated location value representing the geographic location of the fixed-location radio device, and
during an active state, request spectrum access from a spectrum management server to spectrum that is available for use by the fixed-location radio device to carry out wireless communications at the geographic location represented by the location value.

15. The fixed-location radio device of claim 14, wherein the fixed-location radio device further verifies that the fixed-location radio device and the electronic device are within close proximity to each other when the location data is determined by the electronic device.

16. The fixed-location radio device of claim 15, wherein the verification includes determining that the location data is received over one of a short-range wireless communication connection between the electronic device and the fixed-location radio device or a wired communication connection between the electronic device and the fixed-location radio device.

17. The fixed-location radio device of claim 16, wherein the location data further includes data representing the time said location data was determined, and the fixed location radio device further verifies that the location data was generated within a predetermined time before the location data is one of received by the fixed-location radio device or received by a remote server from the electronic device.

18. The fixed-location radio device of claim 15, wherein the verification includes measuring signal strength on predetermined channels and transmitting measured signal strength values to a server for comparison to a predetermined spectrum footprint for the location.

19. The fixed-location radio device of claim 14, wherein the location data further includes data representing the time the location data was determined, and the fixed location radio device further verifies that location data was generated within a predetermined time before the location data is one of received by the fixed-location radio device or received by a remote server from the electronic device.

20. A method of determining a location of a fixed-location radio device with a separate electronic device, comprising:
  determining, with the separate electronic device and during a configuration mode of the fixed-location radio device, a location of the separate electronic device to within a predetermined accuracy;
  obtaining, with the separate electronic device and during the configuration mode of the fixed-location radio device, a key from the fixed-location radio device; and
  submitting, with the separate electronic device and during the configuration mode of the fixed-location radio device, the location and key to at least one of the fixed-location radio device or a server;
  wherein the determining, obtaining and submitting are carried out within a predetermined amount of time as a validity check to ensure that the location of the separate electronic device is determined in close proximity to the actual geo-location of the fixed-location radio device; and
  wherein, during an active state of the fixed-location radio device, the determined location of the separate electronic device serves as the geographic location of the fixed-location radio device in spectrum access requests made by the fixed-location radio device to a spectrum management server.

21. The method of claim 20, wherein the key is obtained by scanning a bar code affixed to the fixed-location radio device.

* * * * *